United States Patent [19]

Rowe et al.

[11] 4,023,025

[45] May 10, 1977

[54] APPARATUS FOR PROCESSING DATA RELATING TO INFORMATION REPRESENTED BY LINES ON A CHART

[75] Inventors: Barry Rowe, Wokingham; Harold Frank Rymer, Twyford, both of England

[73] Assignee: Ferranti, Limited, Hollinwood, England

[22] Filed: Nov. 5, 1975

[21] Appl. No.: 629,126

[30] Foreign Application Priority Data

Nov. 9, 1974  United Kingdom ............. 48612/74

[52] U.S. Cl. .............................. 235/152; 35/10.4; 340/172.5
[51] Int. Cl.² .......................................... G09B 9/00
[58] Field of Search .......................... 235/152, 151; 340/172.5; 35/10.4

[56] References Cited

UNITED STATES PATENTS

| 3,639,736 | 2/1972 | Sutherland | 235/152 |
| 3,801,720 | 4/1974 | Rymer | 35/10.4 |
| 3,816,726 | 6/1974 | Sutherland et al. | 235/152 |

*Primary Examiner*—David H. Malzahn
*Attorney, Agent, or Firm*—Cameron, Kerkam, Sutton, Stowell & Stowell

[57] ABSTRACT

Data processing apparatus for processing data relating to information represented by lines on a chart includes two stores, a computer, and a logic unit. One of the stores contains the cartesian coordinates of a plurality of spaced points along the lines while the other store contains the individual elements forming the lines between the spaced points. The computer operates to select sets of elements which may approach within a predetermined area around a point of interest on the chart, while the logic unit checks whether any element actually does fall within this predetermined area.

5 Claims, 7 Drawing Figures

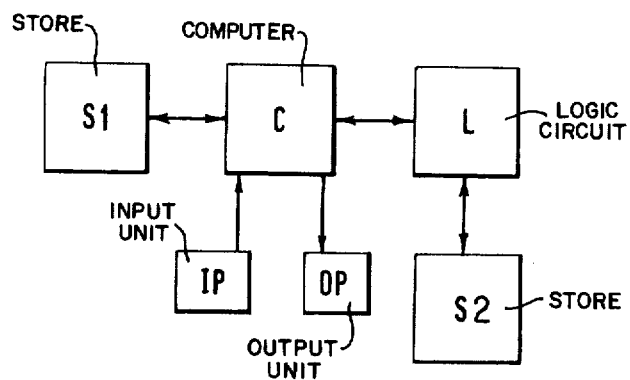
FIG. 1.
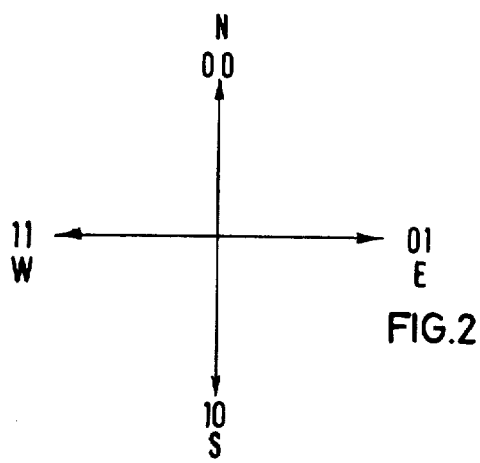
FIG. 2.
FIG. 5.
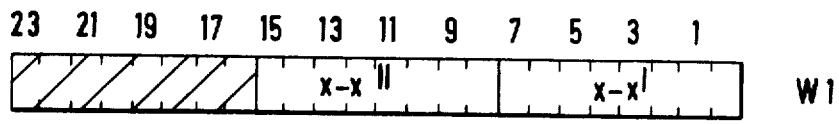
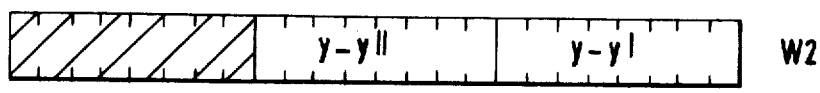

APPARATUS FOR PROCESSING DATA RELATING TO INFORMATION REPRESENTED BY LINES ON A CHART

This invention relates to data processing apparatus, and particularly to such apparatus for processing data defining topographic features.

Topographic features are represented on a map in one of two ways. Many features are represented by different categories of lines, such as contours, roads and railways, rivers, and the outlines of built-up areas or woods. Other features are represented by way of what may be called "point" symbols, such as buildings of various types and spot heights. These two types of representation, together with words, give all the information which is normally to be found on a map.

If the data defining these and other topographic features is given, in suitable form, to a computer, then many types of problems may be solved very quickly to provide information which would otherwise be obtained only by the expenditure of much time and effort. It would be possible, for example, to obtain details of the probable area coverage of radio or television transmitters.

One of the problems arising from such a requirement is that of storing and processing the necessary data. An area of hilly country may have many miles of contour lines along it. It is known, however, from our co-pending application Ser. No. 414,343 now U.S. Pat. No. 3,909,605, dated Sept. 30, 1975, to store such information by defining the co-ordinates of a number of spaced points along a particular line, and by storing separately information defining the shape of the line between successive points. The distance between these points, referred to hereafter as "joints," depends upon the shape of the line; for fairly straight lines the joints may be more widely spaced than for lines of complex shape. The line between two joints may be represented by a number of "elements" each in the form of a straight line extending in one of the four cardinal compass directions. If the elements are short enough the succession of elements approximate to the required shape with sufficient accuracy. The set of elements between two joints is referred to as a "span."

It is an object of the invention to provide apparatus for processing data relating to information represented by lines on a chart, in which the lines are represented in the form stated above.

According to the present invention there is provided apparatus for processing data relating to information represented by lines on a chart, which includes first, storage means arranged in operation to store data representing the co-ordinates of a plurality of spaced points along the or each required chart line, second storage means arranged in operation to store data representing a number of sets of elements each set being defined by one of said spaced points and determining the chart line between said one point and the next, computer means connected to the first storage means and arranged in operation to identify the or each spaced point relating to a particular chart line and within a predetermined area around a point of interest on the chart, and logic means connected to the computer means and to the second storage means to receive data therefrom and arranged in operation to determine which elements in each set defined by an identified spaced point approach within a predetermined area around said point of interest.

According to a preferred embodiment the logic means are operable to determine which elements actually pass through the point of interest.

An embodiment of the invention, concerned with topographic information, will now be described with reference to the accompanying drawings in which:

FIG. 1 is a block diagram of the complete data processing apparatus;

FIG. 2 illustrates the element coding used;

FIG. 5 illustrates the form of the computer output words;

Referring now to FIG. 1, the complete data processing apparatus may be of the general form shown. The apparatus is centred around the computer C which has its own store S1. A second store S2 is provided, associated with a logic unit L. The computer is provided with peripheral input and output units IP and OP respectively, for loading programs, data and so on.

As already stated, each of the lines on the chart, hereafter referred to as "chart lines," represents a topographic feature and is divided into spans of convenient length, depending upon the compexity of the line shape. The joints at the beginning of spans are defined by their cartesian coordinates with respect to some suitable datum, and the co-ordinates are stored in store S1. The datum may conveniently be that of the grid system used on the chart. The number of such joints which may be stored is determined entirely by the capacity of the store. The store S1 will also contain data defining the category of the line on which the joints lie, and supplementary data within categories.

The span between adjacent joints is divided up into elements each of a convenient length. This will depend upon the required accuracy of the stored data. For a chart scale of 1 in 50,000, the 2 centimeters to 1 kilometer scale, an element length of say 25 meters is suitable. The data relating to the elements is stored in the autonomous store S2, each element being represented by two bits of data. As illustrated in FIG. 2, two bits are sufficient to indicate the direction of an element from the end of the preceding element. Hence a span is represented by a number of pairs of bits, in this case up to 96 pairs using 8 words each of 24 bits.

It is convenient, for reasons which will be described later, to divide the stored area into, say, 10 kilometer squares, and to ensure that a joint is located wherever a span crosses the horizontal and vertical boundaries of the square. This will, of course, result in a variation in the number of elements in a span. The number suggested above is only a maximum.

The type of problem which the processor is intended to answer concerns the question of which charge line or lines representing a particular type of feature pass through, or near, a point of interest. Alternatively the question may relate to a particular chart line representing a defined feature. The solution to such a problem may be used for many purposes. For example, the checking of a proposed road route to see if it is subject to any obstructions, delays or diversions could be carried out by comparing the known locations of such delays etc., with the proposed route. Similarly the question of which main road passes through or nearest to a particular point, say a village.

Figure 3:
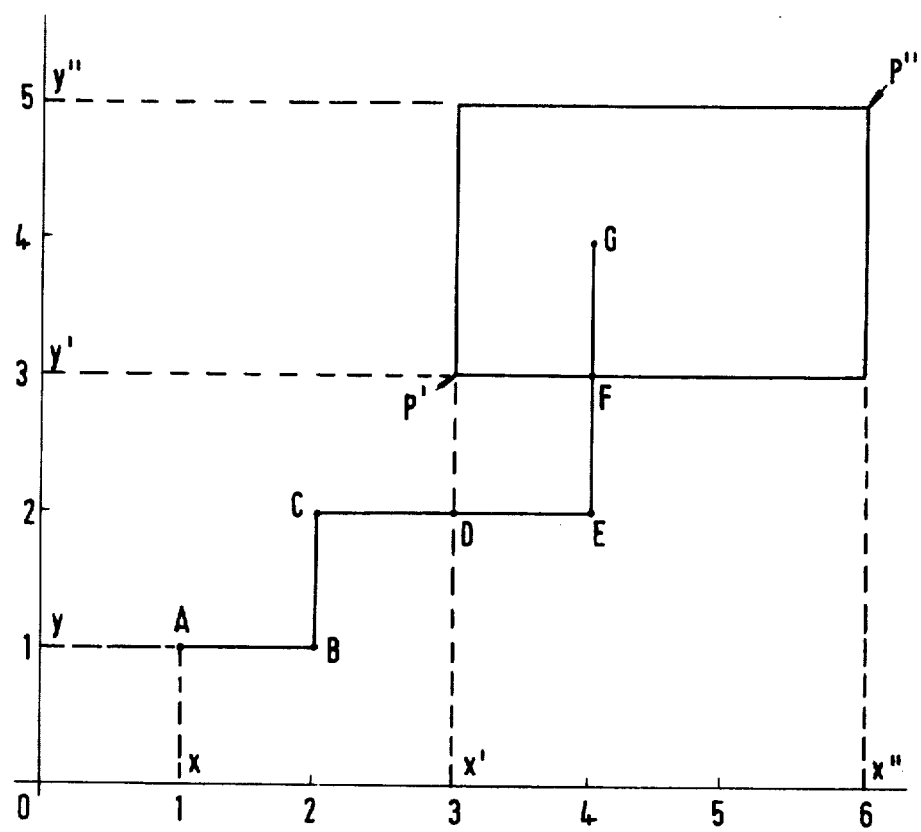
FIG. 3 illustrates the solution of one particular problem.

Consider the question of whether or not a particular road passes through a particular town. The town will be represented by an area rather than a point, and this area should be approximated to a rectangle the sides of which are an integral number of elements long. FIG. 3 illustrates the case where the rectangle has sides of 3 and 2 elements, and shows a part of a road represented by a number of successive elements. As already stated, the computer will supply to store S2 (FIG. 1) the co-ordinates of all joints along the particular road, in this case, within a 10 Km square containing the town. The co-ordinates will be expressed in cartesian terms relative both to the bottom left-hand corner of the 10 Km square and to the bottom left-hand and top right-hand corners of the rectangle representing the town. Hence referring to FIG. 3, the co-ordinates of joint A are expressed twice; firstly as $[(x-x'), (y-y')]$ where $x$ and $y$ are the co-ordinates of point A relative to the origin 0 and $x'$ and $y'$ are the co-ordinates of the corner P', secondly as $[(x-x''), (y-y'')]$ where $x''$ and $y''$ are the co-ordinates of the corner P''. Each successive point B, C, D etc., is considered in turn, the direction of each element from the joint or from the end of the previous element being known. For a point on a line to be within the rectangle, $(x-x')$ and $(y-y')$ must be positive and $(x-x'')$ and $(y-y'')$ must be negative.

Figure 4:
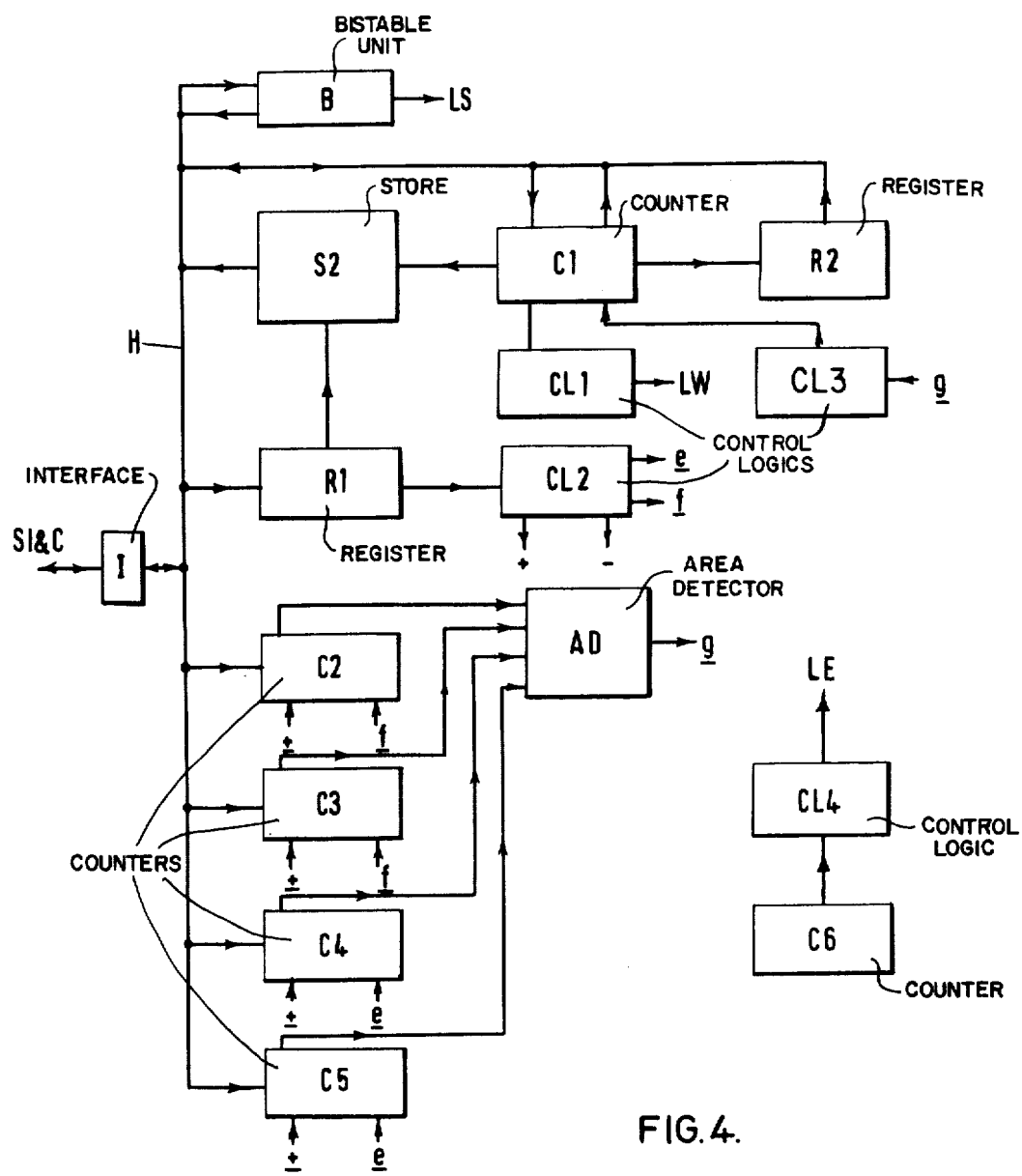
FIG. 4 illustrates the logic means necessary to solve the problem of FIG. 3.

The logic means L necessary to determine this condition is illustrated in FIG. 4. Referring now to FIG. 4, the store S2 and the various items of the logic unit are linked via a data highway H, which is connected via an interface I to the computer C. Only the data highways are shown, clock and shift inputs being omitted for the sake of clarity. The sequence of operations will be apparent from the description given later.

The input to the store S2 is by way of a register R1 communicating directly with the highway H. Also applying an input to the store S2 is a counter C1, which also applies an input to a register R2 and to control logic CL1. Register R1 applies an input to control logic CL2 which produces control signals for other units.

Four counters C2, C3, C4 and C5 are connected to highway H, and all have the outputs from their sign bits connected to an area detector AD, the output $g$ of which is connected to control logic CL3. This applies a signal to C1, dependent on $g$, to output data on to the highway.

As the elements are processed they are counted by C6 and CL4 produces a "last element of a word" signal LE. Control logic CL1 derives a "last word of a span" signal LW and a bistable unit B produces a "last span" signal LS.

Register R1 holds span data relating to the number of elements. A capacity of 24 bits, for example, enables the details of 12 elements to be stored at any one time. Counters C2, C3, C4 and C5 hold co-ordinates of a joint relative to the corners of the rectangle. Since the joint and rectangle may be at opposite corners of the area under consideration the counters must be large enough to hold the length of the side of this area, e.g. for 10 Km sq. in 25 m elements 8 bits are required. Counter C6 requires 4 bits when there are 12 elements per word. C1 and R2 are used to hold store addresses; for a 64K word store 16 bits are required.

As already stated, the computer C determines which joints relate to spans of possible interest, and passes to spare capacity in store S2 the co-ordinates and identifying joint number of each joint. This data is passed in batches dependent upon the available capacity of store S2. The three words used to define each joint are coded as shown in FIG. 5. Word 1 (W1) holds $(x-x')$ in bits 0–7 and $(x-x'')$ in bits 8–15; similarly $(y-y')$ and $(y-y'')$ are held in word 2 (W2). Word 3 (W3) holds the joint number JN in bits 0–11 and bit 23 is set when the joint is the last one of the batch.

After a batch of joint data has been loaded into store S2, register R2 is set to the address of word 1 of the first joint. The address in R2 is loaded into counter C1, $(x-x')$ is loaded into counter C2 and $(x-x'')$ is loaded into counter C3. Counter C1 is then incremented and $(y-y')$ and $(y-y'')$ are loaded into counters C4 and C5. Counter C1 is incremented again and its contents plus 1, that is, the address of word 1 of the second joint, is transferred to register R2. The joint number from word 3 (joint 1) is read into counter C1, at the correct significance, so that counter C1 contains the address of the first word of the span associated with joint 1. This span word is read into R1.

The contents of the register R1 are shifted, two bits (one element) at a time, to control logic CL2. This logic is such that if the two bits are 00 or 10 (representing elements directed North or South) then pulse $e$ is produced, whilst bits 01 or 11 (East or West elements) results in pulse $f$ being produced. Similarly the "add" signal is produced in response to element codes 01 or 00, whilst the "subtract" signal is produced in response to element codes 11 or 10. The add and subtract signals are applied to counters C2, C3, C4 and C5. The $e$ pulse is applied to counters C4 and C5, and the $f$ pulse to counters C2 and C3.

The first time during a span that the area detector AD produces output signal $g$ it is staticised in control logic CL3 and the joint number from counter C1 is returned to the computer via highway H and interface I. Subsequent $g$ signals during the span are ignored. The staticiser is cleared before the start of the next span.

Control logic CL4 detects the last element of each word (LE) and causes counter C1 to be incremented so that the next span word can be read into R1. Counter C6 which is connected to control logic CL4 is reset at the beginning of each word.

Control logic CL1 detects the last word of a span (LW) and when this and LE occur counter C1 is loaded with the address of the next joint from register R2 etc.

The bistable unit B detects the last span bit, (bit 23 of word 3) and when this, LW and LE occur together, bistable is set to indicate to the computer that all available spans have been processed.

The area detector AD only uses the sign bits from counters C2 to C5; consequently only two conditions arise, firstly if the number is negative and secondly if it is zero or positive. If $(x-x')$ etc., are loaded into the counters, the area detector produces an output when $(x-x')$ and $(y-y')$ are zero or positive, and $(x-x'')$ and $(y-y'')$ are negative. This is when the chart line is within the rectangle or on its South or West edges, but not on the other two edges. If it is required that the chart line be detected only within the rectangle, C2 to C5 are loaded with $(x-x'-1)$, $(x-x'')$, $(y-y'-1)$ and $(y-y'')$ respectively.

Consider now the first point A shown in FIG. 3. The value $(x-x'-1)$ is loaded into counter C2, $(x-x'')$ into counter C3, $(y-y'-1)$ into C4 and $(y-y'')$ into counter C5. These values are $-3$, $-5$, $-3$ and $-4$ respectively. The element code 01, in respect of element AB, is applied from register R1 to control logic CL2. This results in the generation of pulse $f$ and the "add" signal. Hence the contents of counters in C2 and C3 are increased by one, that is from $-3$ to $-2$, and from $-5$ to $-4$ respectively.

For the next element BC, the code is 00, and hence the control logic CL2 produces pulse $e$ and the add signal. This increases the contents in counters C4 and C5 by one, i.e. from $-3$ to $-2$ and $-4$ to $-3$ respectively.

The above procedure is repeated for each successive element until point G is reached, this being the first point within range of the 3 × 2 rectangle. The procedure may now be interrupted to inform the computer that the chart line passes through the rectangle; if necessary the joint number can be given via control logic CL1 and counter C1. If required, the process may be continued until the computer has a list of all joints which have at least part of their associated span crossing the rectangle. For joints on a continuous line counters C2, C3, C4 and C5 do not require any joint data after the first, since the elements making up the chart line lead from one joint to the next.

Figure 6:
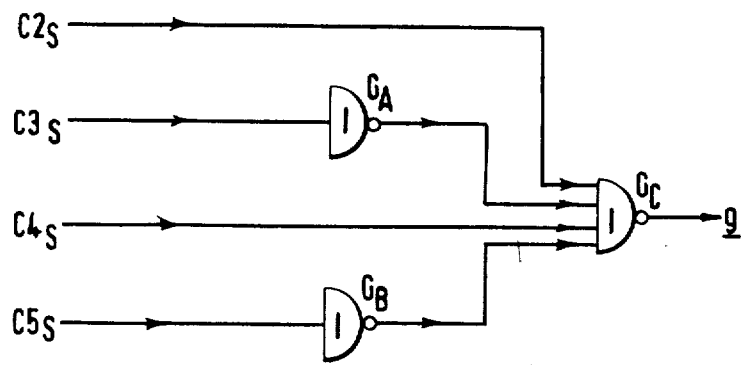
FIG. 6 shows details of the area detector AD of FIG. 4.

The area detector determines whether or not the chart line enters the range rectangle. FIG. 6 shows the logic diagram. References $C2_S$, $C3_S$, $C4_S$ and $C5_S$ refer to the sign bits of counters C2, C3, C4 and C5, respectively. $C3_S$ and $C5_S$ are connected to gates $G_A$ and $G_B$ respectively, the outputs of these together with $C2_S$ and $C4_S$ are connected to gate $G_C$ which gives an output $g$.

The area detector operates as follows. Consider the example of FIG. 3 and the case where counters C2, C3, C4 and C5 are loaded as described above. At point A the contents of these counters are $-3$, $-5$, $-3$ and $-4$, so that all sign bits $C2_S$ to $C5_S$ are '1'. Both $C2_S$ and $C4_S$ ensure that $g$ is a '0'. The contents of counters C2 to C5 become more positive moving from A to B to C to D. From D to E counter C2 changes from $-1$ to 0 and hence $C2_S$ changes from '1' to '0'. At E only $C4_S$ (counter C4 containing - 2) holds $g$ to a '0'. Moving to F, the contents of counter C4 becomes $-1$, at G they become '0' and $C4_S$ changes to '0' At this point $C2_S$ is also '0' and $C3_S$ and $C5_S$ are '1' which is the condition for $g$ to be a '1'. Hence the chart line has been found to go within the rectangle.

The rectangular area could equally be a square with no change in the logic configuration.

The rectangle may be reduced in size until the test examines whether the chart line passes through one particular point. A modification may be used to detect this actual coincidence between a point of interest and the end of an element. In such an instance counters C3 and C5 are not required, nor is area detector AD. The contents of counters C2 and C4 are checked by zero detectors to determine the "all zeroes" condition which indicate coincidence. In this case the co-ordinates $x'$ and $y'$ are those of the actual point of interest.

Figure 7:
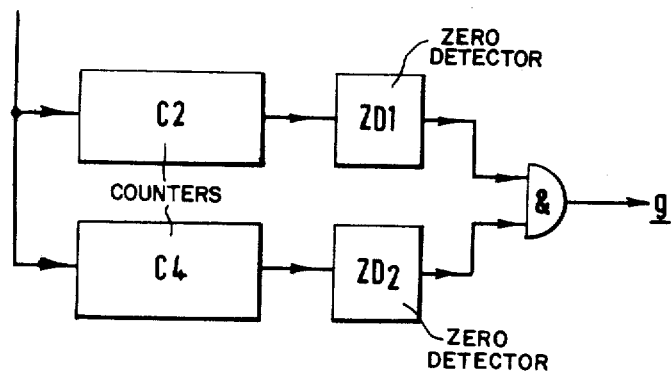
FIG. 7 shows a modification of part of the logic means of FIG. 4, wherein counters C3 and C5 and area detector AD are not required when the apparatus is used to determine whether a chart line passes through one particular point on the chart.

FIG. 7 illustrates this modification of FIG. 4, showing zero detectors ZD1 and ZD2.

The size of the basic "playing area" considered when the computer selects the joints defining spans of possible interest may be of any convenient size, and need not represent the area of 10 Km sides referred to earlier.

The embodiment described above relates to topographic information. The invention may be applied equally well to other forms of information represented by lines on a chart. For example plots of magnetic or electric fields are also represented by lines as are many other types of information.

The number and length of the words used to apply coordinates and joint numbers to the logic may be varied to suit different circumstances. The coding of the quadrants and the logic configuration may also be changed as required.

What we claim is:

1. Apparatus for processing data relating to information represented by lines on a chart, which includes first storage means for storing data representing the coordinates of a plurality of spaced points along the or each required chart line, second storage means for storing data representing a number of sets of elements each set being defined by one of said spaced points and determining the chart line between said one point and the next, computer means operably connected to the first storage means for identifying the or each spaced point relating to a particular chart line and within a predetermined area around a point of interest on the chart, and logic means connected to the computer means and to the second storage means and operable to determine which elements in each set defined by an identified spaced point approach within said predetermined area around said point of interest.

2. Apparatus as claimed in claim 1 in which the predetermined area is a rectangle, the logic means including four counters each for storing a number representing one or other coordinate of the end of an element relative to one of two predetermined corners of the rectangle, and sign sensing means for indicating when the signs of the stored numbers represents a point within said predetermined area.

3. Apparatus as claimed in claim 2 including means whereby the number stored in each counter is increased or decreased by one, or remains unchanged, for each successive element of unit length in a set of elements.

4. Apparatus as claimed in claim 1 in which the predetermined area is the point of interest, the logic means including two counters each operable to store a number representing one or other coordinate of the end of an element relative to the point of interest, and detection means for indicating coincidence between the numbers in the counters and the respective coordinates of the said point of interest.

5. Apparatus as claimed in claim 4 including means whereby the number stored in each counter is increased or decreased by one, or remains unchanged, for each successive element of unit length in a set of elements.

* * * * *